(12) United States Patent
Reiss

(10) Patent No.: US 7,991,006 B2
(45) Date of Patent: Aug. 2, 2011

(54) FILTERING REDUNDANT PACKETS IN COMPUTER NETWORK EQUIPMENTS

(75) Inventor: Christophe Reiss, Grenoble (FR)

(73) Assignee: Oracle America, Inc., Redwood City, CA (US)

( * ) Notice: Subject to any disclaimer, the term of this patent is extended or adjusted under 35 U.S.C. 154(b) by 1429 days.

(21) Appl. No.: 10/485,877

(22) PCT Filed: Aug. 2, 2001

(86) PCT No.: PCT/IB01/01382
§ 371 (c)(1),
(2), (4) Date: Aug. 2, 2004

(87) PCT Pub. No.: WO03/013102
PCT Pub. Date: Feb. 13, 2003

(65) Prior Publication Data
US 2004/0267945 A1    Dec. 30, 2004

(51) Int. Cl.
*H04J 3/24* (2006.01)
*H04J 3/16* (2006.01)
*H04J 3/22* (2006.01)
*H04L 12/28* (2006.01)
*H04L 12/56* (2006.01)
*G06F 15/16* (2006.01)
*G06F 9/00* (2006.01)
*G06F 17/00* (2006.01)

(52) U.S. Cl. ........ 370/474; 370/389; 370/392; 370/394; 370/469; 709/228; 726/13

(58) Field of Classification Search ................... 370/389
See application file for complete search history.

(56) References Cited

U.S. PATENT DOCUMENTS

| | | | |
|---|---|---|---|
| 4,736,465 A | | 4/1988 | Bobey et al. |
| 5,151,899 A | * | 9/1992 | Thomas et al. ............... 370/394 |
| 5,337,313 A | * | 8/1994 | Buchholz et al. ............. 370/394 |
| 5,432,907 A | | 7/1995 | Picazo, Jr. et al. |
| 5,444,703 A | * | 8/1995 | Gagliardi et al. ............. 370/401 |
| 5,610,595 A | * | 3/1997 | Garrabrant et al. ...... 340/825.52 |
| 5,668,812 A | * | 9/1997 | Akiyoshi ...................... 370/474 |
| 5,805,816 A | | 9/1998 | Picazo, Jr. et al. |
| 5,987,462 A | * | 11/1999 | Kasao et al. ..................... 707/10 |
| 6,038,594 A | | 3/2000 | Puente et al. |
| 6,052,733 A | | 4/2000 | Mahalingam et al. |
| 6,122,670 A | * | 9/2000 | Bennett et al. ................. 709/236 |
| 6,170,061 B1 | * | 1/2001 | Beser ................................ 726/3 |
| 6,335,933 B1 | * | 1/2002 | Mallory ......................... 370/394 |
| 6,359,888 B1 | * | 3/2002 | Koch et al. .................... 370/394 |
| 6,466,574 B1 | | 10/2002 | Fujisaki et al. |
| 6,493,340 B1 | * | 12/2002 | Kawanaka ..................... 370/392 |
| 6,678,283 B1 | * | 1/2004 | Teplitsky ....................... 370/463 |
| 6,694,388 B1 | * | 2/2004 | Schzukin et al. ............... 710/52 |

(Continued)

*Primary Examiner* — Andrew Chriss

(74) *Attorney, Agent, or Firm* — Robert C. Kowert; Meyertons, Hood, Kivlin, Kowert & Goetzel, P.C.

(57) ABSTRACT

A node NI has a protocol stack (10), between application (13) and management (11) layers, and two or more Link level interfaces (12, 14) to network links (31, 32). Protocol stack (10) has a multiple data link interface (101), which may duplicate packets at transmission, to be sent through links (31, 32), respectively. A memory area is reserved. At reception, an identifier (X) is calculated for each incoming packet e.g. form its IP header, and is searched in at least a portion of the reserved memory area; if X is not found (or not found for the source node), the packet identifier (X) is stored in currently reserved portion of the memory area.

26 Claims, 10 Drawing Sheets

U.S. PATENT DOCUMENTS

| | | | |
|---|---|---|---|
| 6,751,238 B1 * | 6/2004 | Lipp et al. | 370/541 |
| 6,807,175 B1 | 10/2004 | Jennings et al. | |
| 6,836,466 B1 * | 12/2004 | Kant et al. | 370/252 |
| 6,901,357 B1 * | 5/2005 | Patiejunas | 703/14 |
| 7,013,482 B1 * | 3/2006 | Krumel | 726/13 |
| 7,360,075 B2 * | 4/2008 | VanHeyningen et al. | 713/151 |
| 2001/0021189 A1 * | 9/2001 | Shiota | 370/389 |
| 2002/0131425 A1 * | 9/2002 | Shalom | 370/401 |

* cited by examiner

FILTERING REDUNDANT PACKETS IN COMPUTER NETWORK EQUIPMENTS

This invention relates to network equipments, as used for example in telecommunication systems.

In such equipments, computer stations or nodes are interconnected through a network medium or link. The link may have to be at least partially duplicated to meet reliability constraints. This is called link redundancy. It is now assumed by way of example that data are exchanged between the nodes in the form of packets. Considering a given packet sent from a source node to a destination ode, redundancy means that two or more copies of that packet are sent to the destination node through two or more different networks, respectively. The copies of the packet will usually reach the destination node at different times. Thus, a first one of the packet copies is normally processed in the destination node; when arriving, the other copy or copies ("redundant packets") will be processed in a manner which may depend e.g. upon the transport protocol and/or the user application.

The known Transmission Control Protocol (TCP) has a built-in capability to suppress redundant packets. However, this built-in capability involves potentially long and unpredictable delays. On another hand, the known User Datagram Protocol (UDP) has no such capability; in this case, suppressing redundant packets is a task for user applications.

A general aim of the present invention is to provide advances with respect to such mechanisms.

In a first aspect, this invention offers redundant packet filtering software code, comprising code for defining:
 a memory manager, having a reserved memory area, in which it defines a currently designated portion of memory, and
 an incoming packet manager, responsive to an incoming packet for:
  determining an identifier (X) from information contained in the incoming packet,
  searching the identifier (X) in at least a portion of the reserved memory area,
  if a first condition related to the search is met, storing the identifier (X) in the currently designated portion of memory, and
  if a second condition related to the search is met, filtering out the incoming packet as redundant.

In a second aspect, this invention offers a method of processing redundant packets comprising the steps of:
 a. determining an identifier (X) from information contained in an incoming packet (630),
 b. searching the identifier (X) in at least a portion of a reserved memory area (560), and
 c. processing the packet, the processing comprising:
  c1. if a first condition related to the search is met, storing the identifier (X) in a currently designated portion of the reserved memory area, and
  c2. if a second condition related to the search is met, filtering out the incoming packet as redundant.

In both cases, as it will be seen:
 the identifier may, or may not, take fragment-containing packets into consideration;
 the identifier may, or may not, take a packet source identifier into consideration, depending upon whether the memory is organized with a particular area for each source address, or not;
 the first condition may include the fact the packet identifier is not found in the memory, at least for un-fragmented packets. Other alternatives of the first and second conditions will be described hereinafter.

This invention also covers a node, having a protocol stack, and a multiple data link interface, capable of at least partially implementing the above functions, and/or their developments to be described hereinafter.

This invention further covers a cluster having a plurality of nodes interconnected through a redundant link, in which at least two of the nodes are arranged for implementing the above functions, and/or their developments to be described hereinafter.

Other alternative features and advantages of the invention will appear in the detailed description below and in the appended drawings, in which.

As they may be cited in this specification, Sun, Sun Microsystems, Solaris, ChorusOS are trademarks of Sun Microsystems, Inc. SPARC is a trademark of SPARC International, Inc.

This patent document may contain material which is subject to copyright protection. The copyright owner has no objection to the facsimile reproduction by anyone of the patent document or the patent disclosure, as it appears in the Patent and Trademark Office patent file or records, but otherwise reserves all copyright and/or author's rights whatsoever.

Additionally, the detailed description is supplemented with the following Exhibits:

Exhibit A contains formulas used in this specification.

In the foregoing description, references to the Exhibits may be made directly by the Exhibit or Exhibit section identifier. One or more Exhibits are placed apart for the purpose of clarifying the detailed description, and of enabling easier reference. They nevertheless form an integral part of the description of the present invention. This applies to the drawings as well.

Now, making reference to software entities imposes certain conventions in notation. For example, in the detailed description, Italics (and/or the quote sign") may be used when deemed necessary for clarity.

Figure 1:
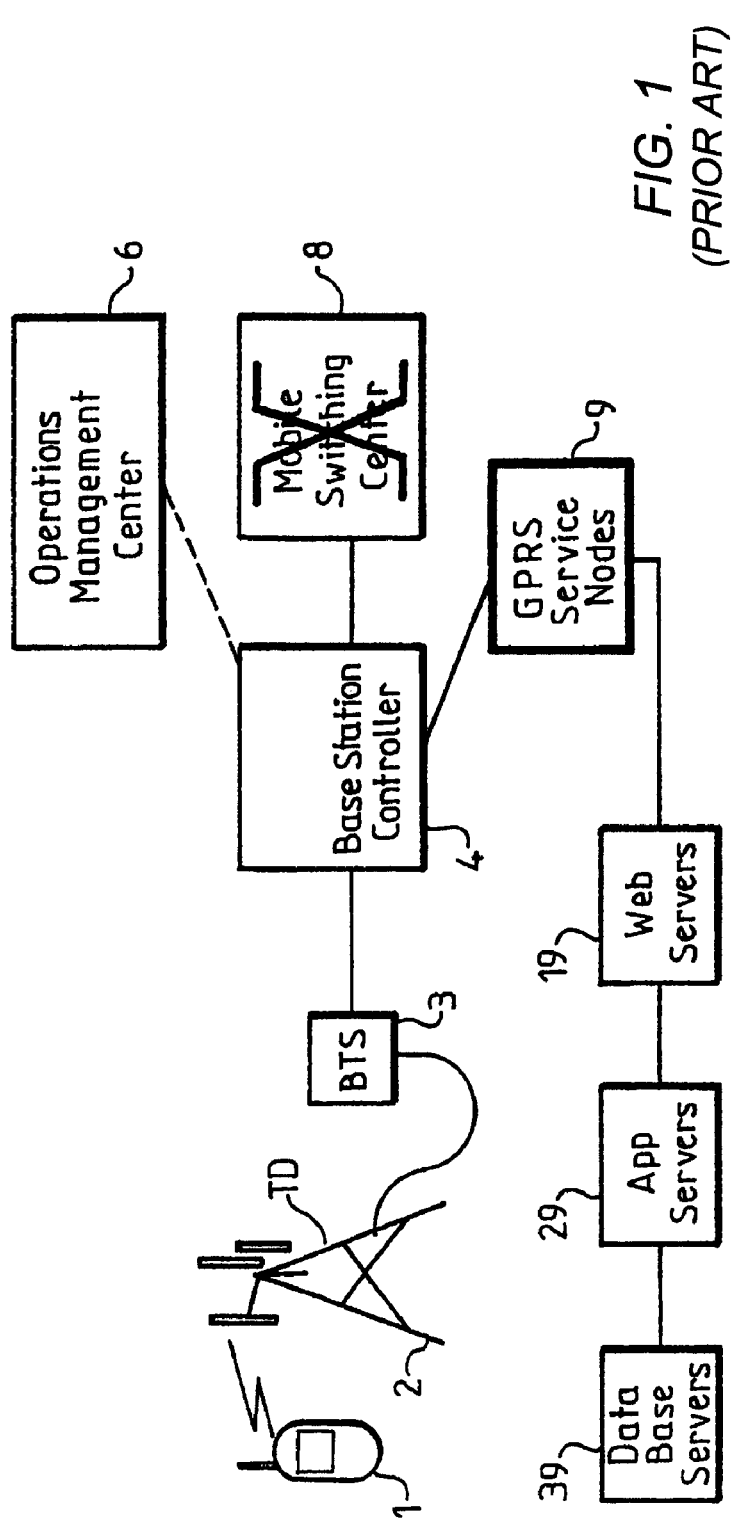
FIG. 1 is a general diagram of a telecommunication network system, as an exemplary context in which this invention may be applicable.

FIG. 1 illustrates an exemplary simplified telecommunication network system. Terminal devices (TD) like 1 are in charge of transmitting data, e.g. connection request data, to base transmission stations (BTS) like 3. A such base transmission station 3 gives access to a communication network, under control of a base station controller (BSC) 4. The base station controller 4 comprises communication nodes, supporting communication services ("applications"). Base station controller 4 also uses a mobile switching center 8 (MSC), adapted to orientate data to a desired communication service (or node), and further service nodes 9 (General Packet Radio Service, GPRS), giving access to network services, e.g. Web servers 19, application servers 29, data base server 39. Base station controller 4 is managed by an operation management center 6 (OMC).

Certain items in the system of FIG. 1, e.g. the base station controllers 4, may comprise one or more groups of nodes, or clusters, exchanging data through two or more redundant networks. Reference to base station controllers is purely exemplary, since other components in a telecommunication systems, as well as in other types of data or message exchanging systems, may have a similar organization.

Figure 2:
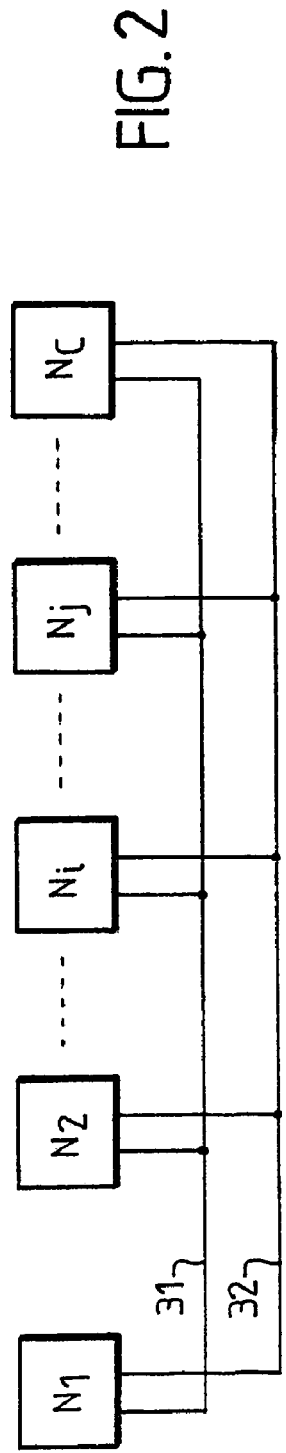
FIG. 2 shows a group of stations or nodes interconnected through two different links.

FIG. 2 now shows a cluster having C nodes N1, N2, ... $N_C$, interconnected through two different links 31 and 32. In the foregoing description, Ni and Nj will designate two nodes, with i and j being comprised between 1 and C, inclusively. The network links or channels 31, 32 as used may be high speed network channels with equivalent bandwidth and latency. However, other channels may be also used, e.g. heterogeneous networks. In a purely exemplary embodiment, links 31 and 32 are arranged as Ethernet physical networks.

Figure 3:
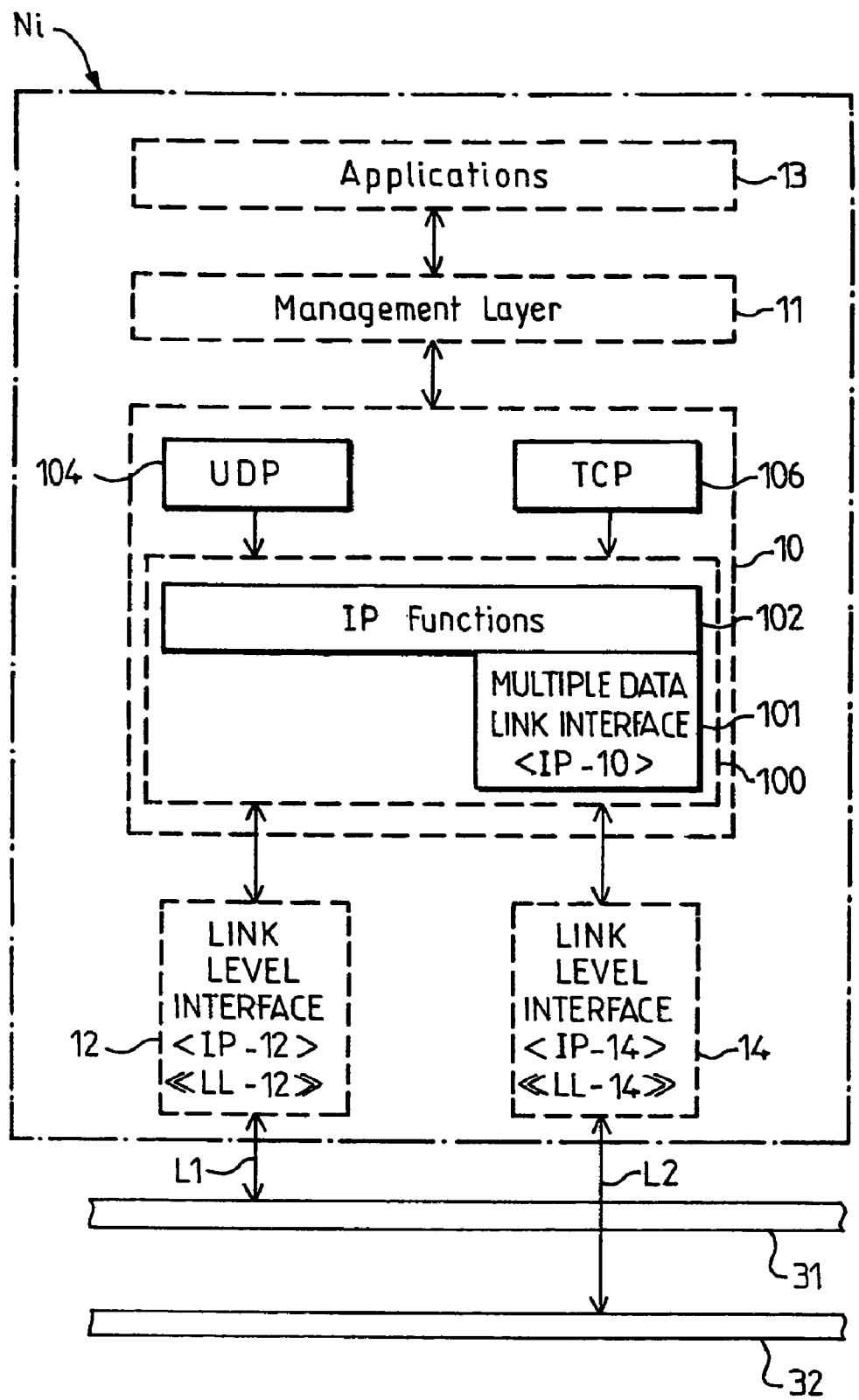
FIG. 3 is an exemplary block diagram of a computer station or node, incorporating an exemplary embodiment of this invention.

FIG. 3 shows an exemplary node Ni, in which the invention may be applied. Node Ni comprises, from top to bottom, applications 13, management layer 11, network protocol stack 10, and link level interfaces 12 and 14, respectively interacting with network links 31 and 32 (also shown in FIG. 2). Node Ni may be part of a local or global network; in the foregoing exemplary description, the network is Internet, by way of example only. It is assumed that each node may be uniquely defined by a portion of its Internet address. Accordingly, as used hereinafter, "Internet address" or "IP address" means an address uniquely designating a node in the network being considered (e.g. a cluster), whichever network protocol is being used. Although Internet is presently convenient, no restriction to Internet is intended.

Thus, in the example, network protocol stack 10 comprises:
    an Internet interface 100, having conventional Internet protocol (IP) functions 102, and a multiple data link interface 101,
    above Internet interface 100, message protocol processing functions, e.g. an UDP function 104 and/or a TCP function 106.

Network protocol stack 10 is interconnected with the physical networks through first and second link level interfaces 12 and 14, respectively. These are in turn connected to first and second network channels 31 and 32, via couplings L1 and L2, respectively. More than two channels may be provided, enabling to work on more than two copies of a packet.

Link level interface 12 has an Internet address <IP_12> and a Link level address <<LL_12>>. Incidentally, the doubled triangular brackets (<< ... >>) are used only to distinguish link level addresses from Internet addresses. Similarly, Link level interface 14 has an Internet address <IP_14> and a Link level address <<LL$_{13}$14>>. In a specific embodiment, where the physical network is Ethernet-based, interfaces 12 and 14 are Ethernet interfaces, and <<LL_12>> and <<LL_14>> are Ethernet addresses.

IP functions 102 comprise encapsulating a message coming from upper layers 104 or 106 into a suitable IP packet format, and, conversely, de-encapsulating a received packet before delivering the message it contains to upper layer 104 or 106.

In redundant operation, the interconnection between IP layer 102 and link level interfaces 12 and 14 occurs through multiple data link interface 101. The multiple data link interface 101 also has an IP address <IP_10>, which is the node address in a packet sent from source node Ni.

References to Internet and Ethernet are exemplary, and other protocols may be used as well, both in stack 10, including multiple data link interface 101, and/or in link level interfaces 12 and 14.

Furthermore, where no redundancy is required, IP layer 102 may directly exchange messages with anyone of interfaces 12, 14, thus by-passing multiple data link interface 101.

Now, when circulating on any of links 31 and 32, a packet may have several layers of headers in its frame: for example, a packet may have, encapsulated within each other, a transport protocol header, an IP header, and a link level header.

Figure 4:
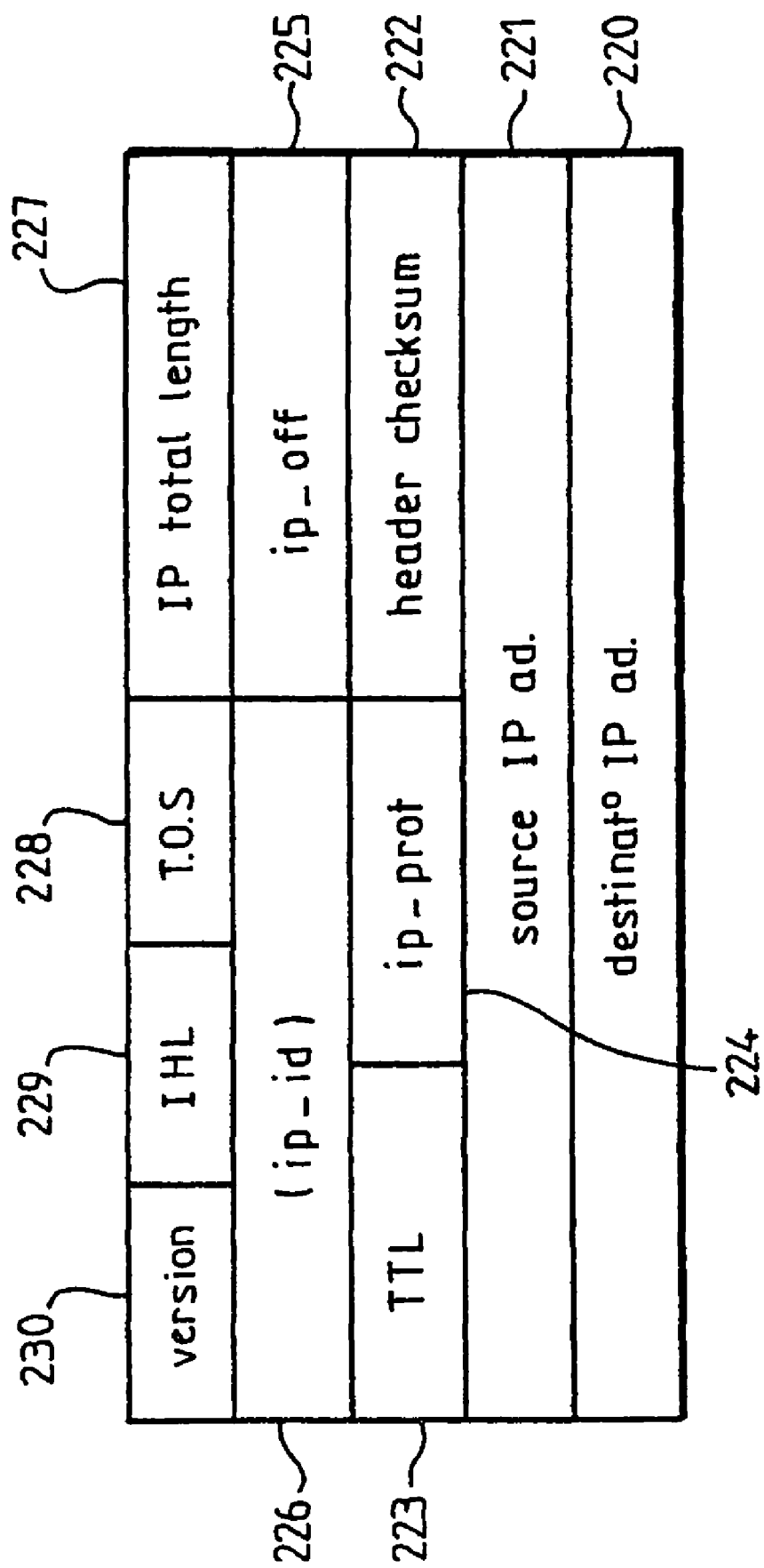
FIG. 4 shows an exemplary format of an IP header in a packet.

As shown in FIG. 4, an exemplary IP header may comprise the following fields:
    a destination IP address 220;
    a source IP address 221;
    a header checksum 222;
    a Time To Live (TTL) 223;
    a protocol identifier (IP-PROT) 224;
    a zone 225 containing fragmentation flags, and fragment offsets TIP-OFF);
    an IP identification (IP-ID) 226;
    an IP total length 227;
    a type of service (T.O.S.) 228;
    a Header Length (Internet Header Length) 229; and
    a version identifier 230.

Certain of these fields are defined at the level of network protocol stack 10. For a packet corresponding to a complete data message, fields 220, 221, 224 and 226 are sufficient to identify the data message. Optionally, a data message may be split into a plurality of fragments, sent through different packets. In this case, a packet corresponding to a fragment of a data message will have its field 225 completed with an indication of the position of the fragment in the data message.

The other fields are mere service fields: for example, field 223 (TTL) determines the time after which the packet may be destructed.

In this specification, "packet header" refers to information attached to a packet, and indicating e.g. the source, the destination, and other service information. No restriction is intended to the packet header being at the beginning of the packet: it may be at the end as well, or even dispersed within the message data.

Figure 5:
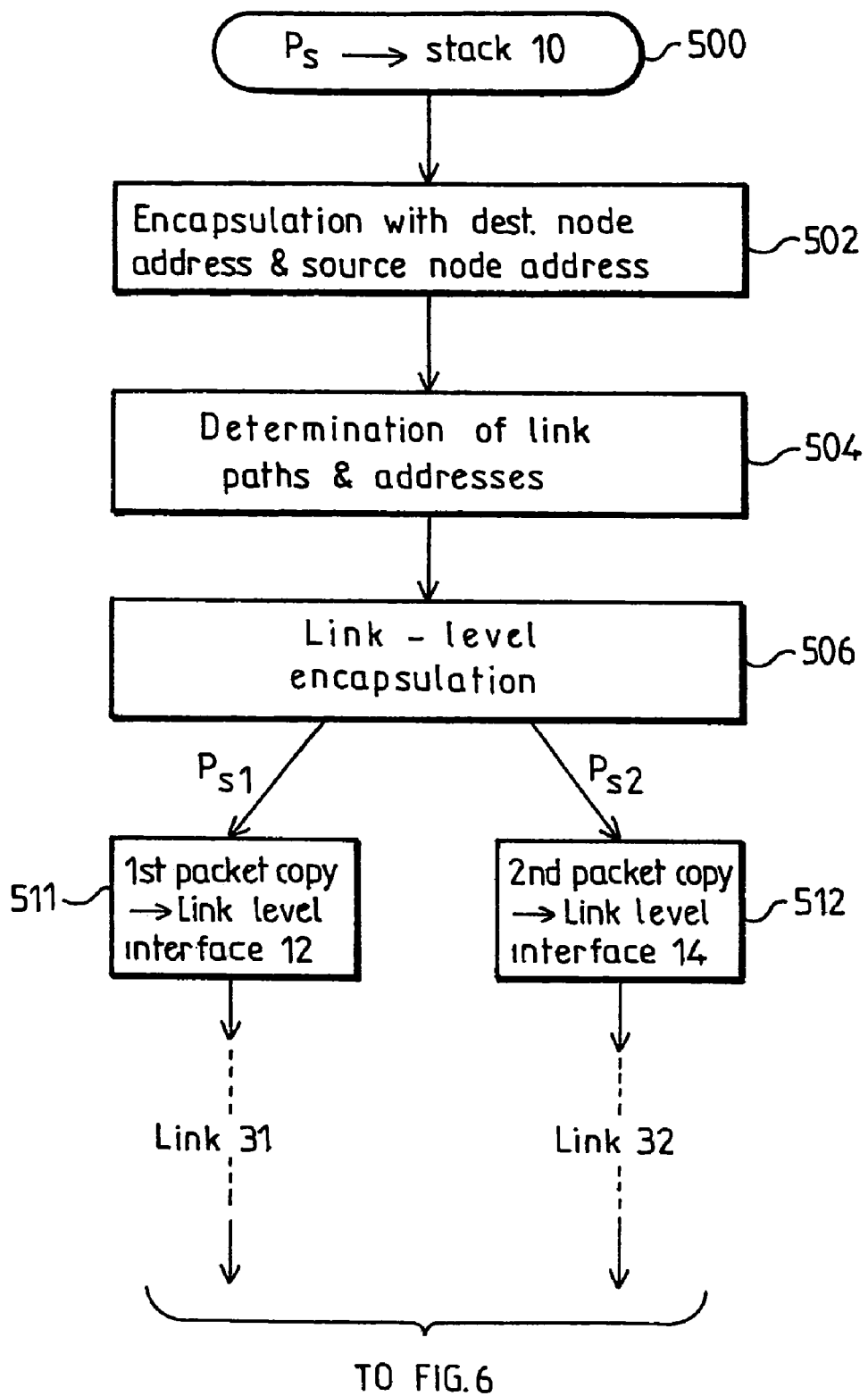
FIG. 5 shows a flow chart of a packet transmission in redundant mode.

The operation of sending a packet Ps in redundant mode will now be described with reference to FIG. 5.

At 500, network protocol stack 10 of node Ni receives a packet Ps from application layer 13 through management layer 11. At 502, packet Ps is encapsulated with an IP header, in which:
    field 220 comprises the address of a destination node, which is e.g. the IP address IP_10(j) of the destination node Nj in the cluster;
    field 221 comprises the address of the source node, which is e.g. the IP address IP_10(i) of the current node Ni.

Both addresses IP_10(i) and IP_10(j) may be "intra-cluster" addresses, defined within the local cluster, e.g. restricted to the portion of a full address which is sufficient to uniquely identify each node in the cluster.

In protocol stack 10, multiple data link interface 101 has data enabling to define two or more different link paths for the packet (operation 504). Such data may comprise e.g.:
    a routing table, which contains information enabling to reach IP address IP_10(j) using two different routes (or more) to Nj, going respectively through distant interfaces IP_12(j) and IP_14(j) of node Nj;

link level decision mechanisms, which decide the way these routes pass through local interfaces IP_12(i) and IP_14(i), respectively;

additionally, an address resolution protocol (e.g. the ARP of Ethernet) may be used to make the correspondence between the IP address of a link level interface and its link level (e.g. Ethernet) address.

At this time, packet Ps is duplicated into two copies Ps1, Ps2 (or more, if more than two links 31, 32 are being used). In fact, the copies Ps1, Ps2 of packet Ps may be elaborated within network protocol stack 10, either from the beginning (IP header encapsulation), or at the time the packet copies will need to have different encapsulation, or in between.

At 506, each copy Ps1, Ps2 of packet Ps now receives a respective link level header or link level encapsulation. Each copy of the packet is sent to a respective one of interfaces 12 and 14 of node Ni, as determined e.g. by the above mentioned address resolution protocol.

In a more detailed exemplary embodiment, multiple data link interface 101 in protocol stack 10 may prepare (at 511) a first packet copy Ps1, having the link level destination address LL_12(j), and send it through e.g. interface 12, having the link level source address LL_12(i). Similarly, at 512, another packet copy Ps2 is provided with a link level header containing the link level destination address LL_14(j), and sent through e.g. interface 14, having the link level source address LL_14(i).

On the reception side, several copies of a packet, now denoted generically Pa should be received from the network in node Nj. The first arriving copy is denoted Pa1; the other copy or copies are denoted Pa2, and also termed "redundant" packet(s), to reflect the fact they bring no new information.

Figure 6:
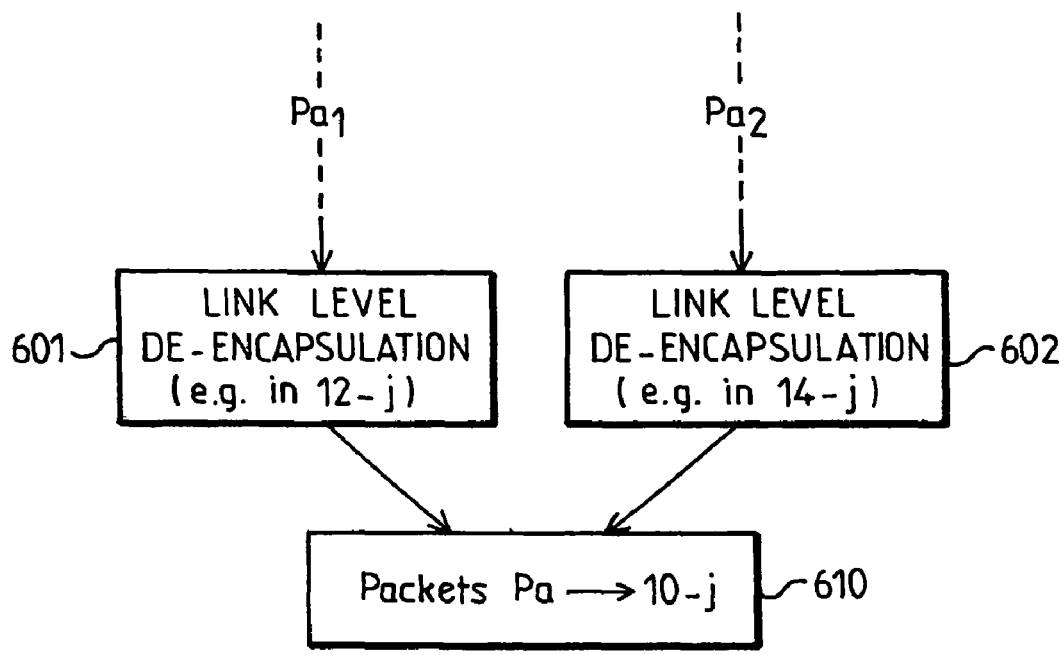
FIG. 6 shows the initial reception of redundant packets.

As shown in FIG. 6, one copy Pa1 should arrive through e.g. Link level interface 12-j, which, at 601, will de-encapsulate the packet, thereby removing the link level header (and address), and pass it to protocol stack 10(j) at 610. One additional copy Pa2 should also arrive through Link level interface 14-j which will de-encapsulate the packet at 602, thereby removing the link level header (and address), and pass it also to protocol stack 10(j) at 610.

Thus, protocol stack 610 normally receives two identical copies of the IP packet Pa, within the flow of other packets. This invention will enable (i) discriminating between a first incoming packet Pa1 and one or more redundant following packets Pa2, and (ii) filtering the packet data. The filtering will depend upon the fact a message is fragmented between several packets or not, if such a fragmentation is authorized. Since the ultimate purpose is in most cases filtering, the word "filtering", as used here, may encompass both discriminating and filtering. It should however be kept in mind that "discriminating" is the basic function.

It should now be recalled that, amongst various transport internet protocols, the messages may use the Transmission Control Protocol (TCP), when passing through function or layer 106; TCP has its own capability to suppress redundant packets but with long and unpredictable delays. The messages may also use the User Datagram Protocol (UDP), when passing through function or layer 104; the User Datagram Protocol relies on application's capability to suppress redundant packets, in the case of redundancy, which is also long and resource consuming.

Incoming packet copies have an IP header according to FIG. 4. The transport protocol (TCP, UDP, or others) being used for a packet is specified in field 224 of the IP header (or, alternatively, in a separate transport protocol header).

This invention may be viewed as providing, at reception side, a filtering function which operates independently of the transport internet protocol being used, i.e whether e.g. TCP or UDP in the case of Internet, or another protocol. This invention is also compatible with the existing transport protocols: the built-in TCP processing of redundant packets may be kept in function; in case of UDP, the processing of redundant packets by user applications may also be kept in function.

Thus, network protocol stack 10 comprises a filtering function to detect and reject redundant packets. The filtering function may be located in multi data link interface 101, or in IP layer 102, or in a distinct function module.

In accordance with an aspect of this invention, information contained in the IP headers of packets may be used for discriminating packets when they arrive to network protocol stack 10. To this effect, this information is used to build distinctive identifiers or "footprints" of the incoming packets.

Figure 7:
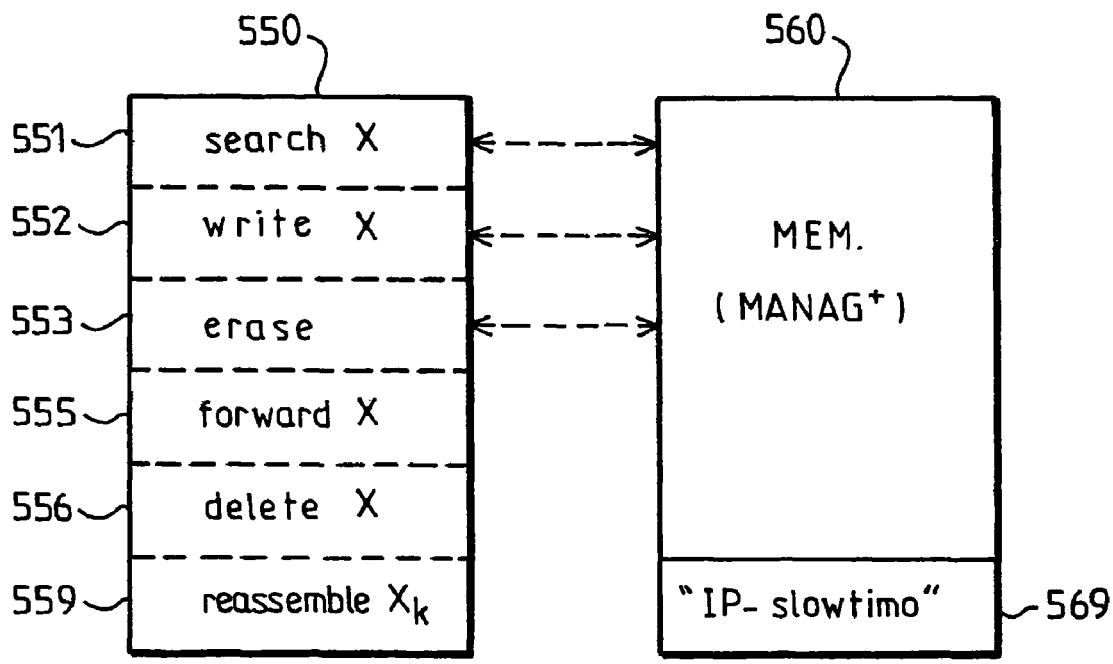
FIG. 7 shows the structure of an exemplary software module used in this invention.

As shown in FIG. 7, the filtering function uses a memory manager 560 having memory area (560M), and an incoming packet manager 550, comprising a set of associated (or "filtering") functions.

In a presently preferred embodiment, the memory area 560M is "reserved" statically for the filtering functions by the central processing unit (not shown) of the node; however, alternatively, the memory area 560M might be allocated dynamically as well, e.g. where the time needed for memory allocation is not penalizing.

The memory manager 560 may divide its memory area into portions of memory, which may be "allocated" and "released" dynamically, and individually. These portions of memory are used to store the above mentioned distinctive identifiers or "footprints".

The "filtering" functions 550 will be identified for convenience as follows:

at 551, search( ) is a function which searches for a footprint in the memory area of 560, or in a part of it;

at 552, write( ) is a function which writes a footprint in the memory area;

at 553, erase( ) is a function which releases a portion of the memory area;

at 555, forward( ) is a function sending a packet to the upper layers;

at 556, delete( ) is a function deleting or throwing a packet;

additionally, if it is desired to process message fragments, a reassemble( ) function at 559 gathers and reorders the fragments before they are forwarded to the upper layers, when the message is complete.

It will be noted that at least functions 551 through 553 interact with memory area 560.

FIG. 7 also shows an independent process 569, named for convenience "IP_slowtimo", whose purpose is to release some part of memory area 560 from time to time.

In fact, the invention may be implemented by using software code, in which memory area 560 is represented by a memory manager (also denoted 560), capable of cooperating with memory hardware existing in the node, to have a reserved memory area, in which it defines at least one currently reserved portion of memory. Additionally, incoming packet manager 550 contains at least some of the filtering functions 551-559, depending upon the desired implementation.

Figure 8:
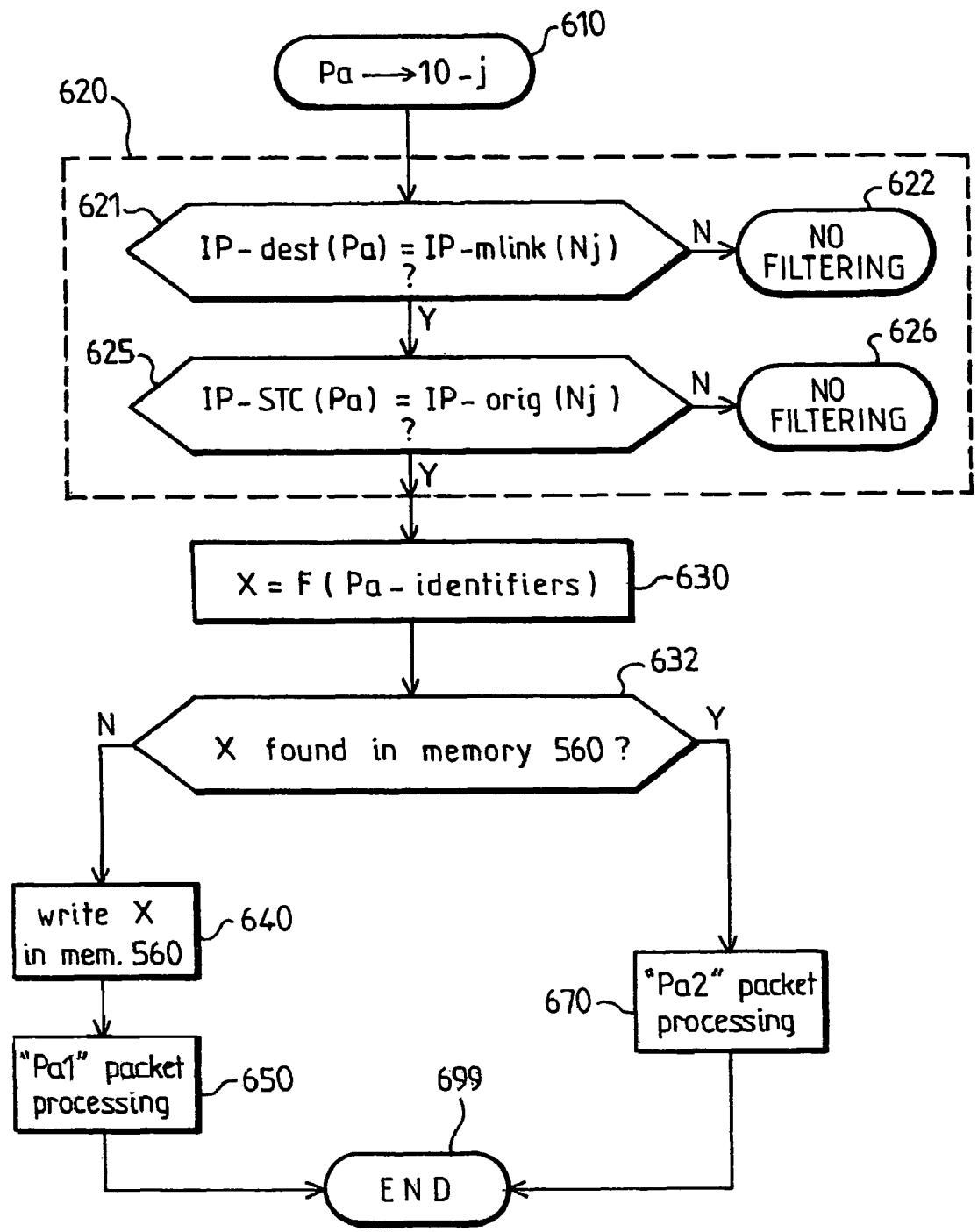
FIG. 8 is a general flow-chart of the discrimination of received packets.
Figure 9:
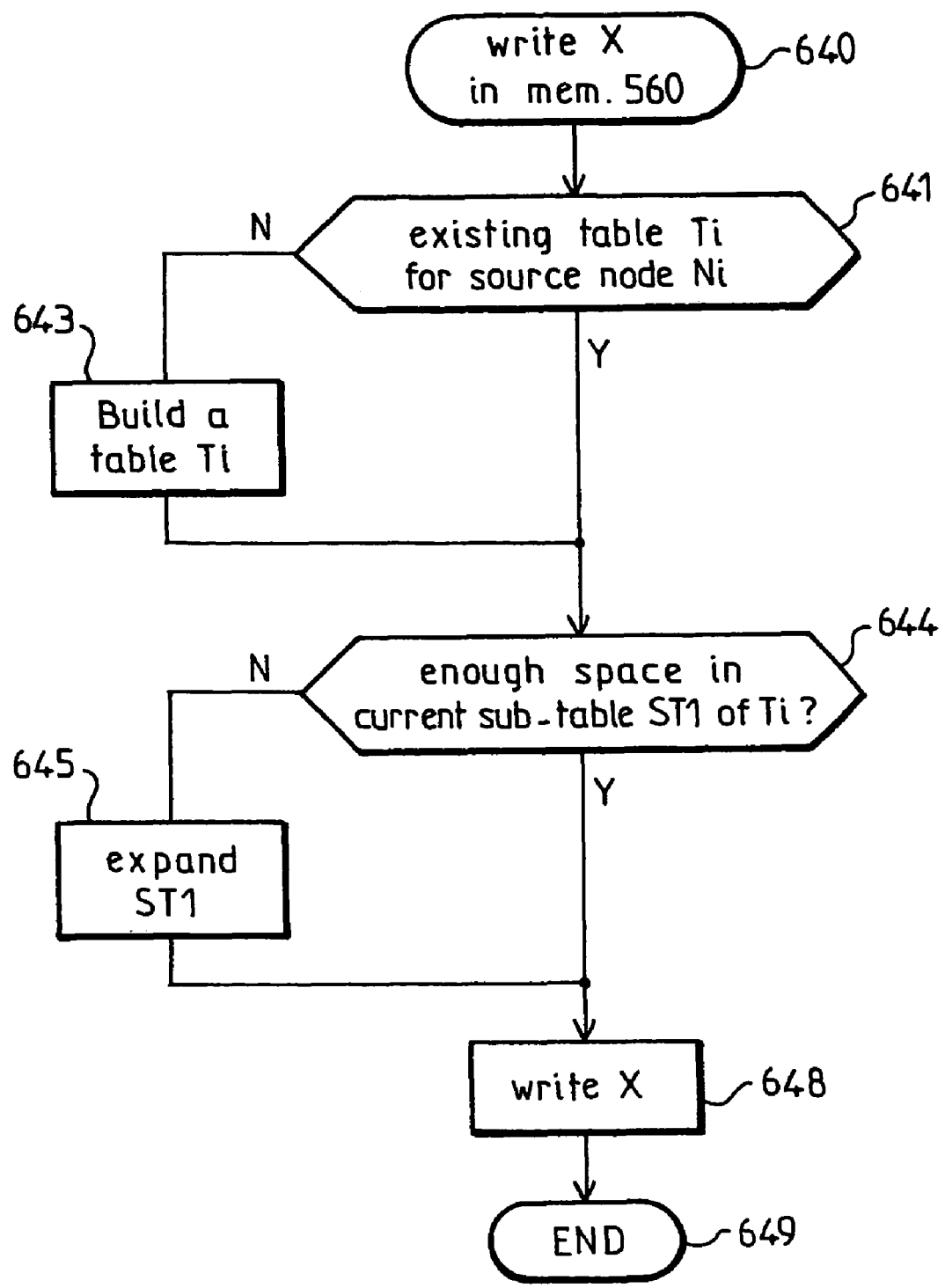
FIG. 9 shows an exemplary detailed embodiment of operation 640 in FIG. 8.

The filtering method will be now described with reference to FIGS. 8 and 9. FIGS. 8 and 9 show an exemplary detailed embodiment, comprising many features which are optional, i.e. not necessary in a simpler embodiment of this invention.

At 610, an IP packet (Pa) reaches protocol stack 10 of its final destination node Nj.

Frame 620 in FIG. 8 contains a set of optional operations, which are of interest when (1) high reliability and/or (2) cluster operation are desired.

Operation 621 checks whether the destination IP address (IP-dest) of the packet Pa matches the IP address (IP-mlink) of the multiple data link interface 101 of node Nj. If not, at 622, no filtering is made; for example, the packet may be subject to a "normal processing", through conventional IP functions 102. Other alternatives of operation 622, may be contemplated, e.g. considering a packet whose address does not match IP-mlink is in error. Operations 621 and 622 may even be omitted, if it is not desired to check the destination address.

Operation 625 checks whether the source IP address (IP-src) of packet Pa matches one of the cluster's node IP addresses (IP-orig) as stored in node Nj. In the example, IP-orig is a list containing the addresses (e.g. "intra-cluster" addresses) of all the nodes in the cluster. If desired, the list may exclude the local node. The list may also be restricted to those of the nodes in the cluster which are currently in operation.

If not, at 626, no filtering is made; for example, the packet may be subject to a "normal processing", through conventional IP functions 102. Other alternatives of operation 625 may be contemplated, e.g. considering a packet whose address does not match IP-orig is in error.

Operations 625 and 626 may even be omitted, if it is not desired to restrict filtering to intra-cluster messages.

The filtering per se begins at 630.

At 630, a value X is computed, using a function F( ), such that a first incoming packet Pa1 and its redundant packet(s) Pa2 shall have the same value of X. Although it generally qualifies as a distinctive packet identifier, this value X is called a footprint hereinafter, for simplification.

Generally, when a packet is identified as a first incoming packet Pa1, i.e. footprint X is not found in memory area 560 at 632 (using the search( ) function), operation 640 stores the footprint X in a portion of memory area 560. A "Pa1" packet processing is made at 650. Otherwise, if X is found, a "Pa2" packet processing is made at 670. Finally, "end" operation 699 is reached.

Function F( ) is chosen, in combination with the internal structure of memory area 560, such that the risk that two packets Pa being not redundant with each other have the same footprint X is made as low as desired.

Generally (FIG. 10), memory area 560 may be organized as one or more tables T, in turn comprising sub-tables ST1 through $ST_L$. Parameter L enables to define an order between the sub-tables, or, at least, a currently in-use sub-table, e.g. ST1; preferably, an older one of the sub-tables, e.g. $ST_L$, is also defined, so as to authorize erasure of old footprints, as it will be seen hereinafter.

The terminology "tables" and/or "sub-tables" is used for clarity in the description; it must be understood that the tables and sub-tables are portions of memory, allocated by memory manager 560 within the memory area reserved to it.

In a first embodiment of this invention, memory area 560 is subdivided into a plurality of tables, each of which may be associated with a respective source address of the packets.

More precisely, a table Ti is dedicated dynamically to a source node Ni (in fact, except Nj), with i being an integer varying from 1 to C. C is the number of nodes in the cluster, or, more generally, the number of source addresses to be considered. A given source node may have several tables Ti. In the example, each table Ti is subdivided into sub-tables ST1-i through $ST_L$-i. The suffix "-i" is implicit in FIG. 10 and the sub-tables may be simply designated as ST1 through $ST_L$ hereinafter.

Figure 10:
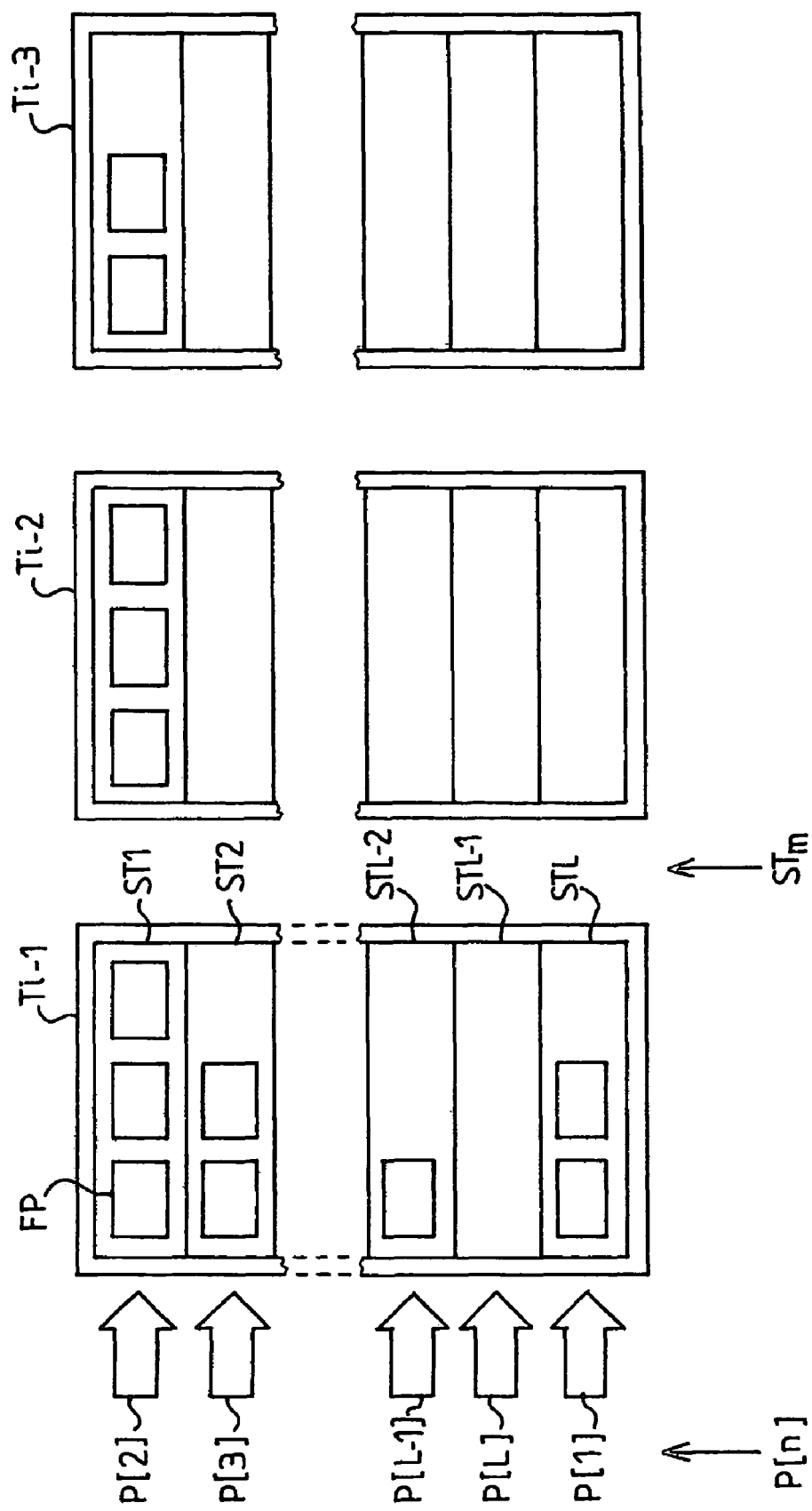
FIG. 10 is an exemplary memory arrangement, for implementing this invention.

In a specific embodiment (whether there is a single table T or several tables Ti), the sub-tables STm (with m from 1 to L) may be associated with pointers P[n] (with n also from 1 to L), such that each pointer P[n] designates a respective one of sub-tables STm. This will be explained in greater detail hereinafter. A given value of the pointer, e.g. P[1], designates the currently in-use sub-table, e.g. $ST_L$ (FIG. 10).

In the first embodiment, the X value as calculated by function F( ) need only to identify each IP packet among packets initiated by source node Ni to destination node Nj. Accordingly, the information from the IP header being used to determine the "footprint" does not include the source address.

Thus, for example when the packet is a data message, the value X may be derived from two fields of the IP header: field 226 or IP-ID, and field 224 or IP-PROT, e.g. using a concatenation of such fields. In a more precisely detailed embodiment, function F( ) may be a hash function of IP-ID and IP-PROT (or of IP-ID only, if a single protocol is being used).

In this case, the search( ) function of operation 632 is applied with footprint X to determine if X already exists in an allocated portion of the memory area, corresponding to node address IP-orig of node Ni, i.e. only in table Ti (if it already exists).

Turning to FIG. 9, operation 640 of FIG. 8 may be implemented in detail as follows:

operation 641 looks whether a table Ti exists for the source node Ni, known from address IP-orig; if not, a table Ti is built at 643, e.g. by memory manager 560.

operation 644 checks whether enough space is available for writing X in the current sub-table ST1 of Ti; if not, ST1 is expanded at 645; this may be viewed as allocates a new "current" portion of memory for node address IP-orig.

then X may be written in the current sub-table ST1 of Ti at 648, and "end" 649 is reached.

In an embodiment, a given sub-table STm is adapted to store "footprints" of packets coming during a defined period of time. The term "footprint" designates an unique and single identification information about a packet, as described hereinabove. To avoid re-writing sub-tables STm, their chronological order may be defined by the pointers P[n].

In accordance with another aspect of this invention, the footprints are stored in the memory area for a limited time, which is called a critical age CA. When a footprint reaches the critical age, it may be deleted. The critical age CA may be a multiple of integer L. Thus, the erasure of footprints in tables Ti may be based on this discrete period of time CA/L.

In an embodiment, this erasure may be performed by independent process 569 (FIG. 7), named e.g. IP-slowtimo. This process may be called periodically by the system (or memory manager 560) to compute a clock, whose tick corresponds to CA/L. Assuming the process has been called at instant t1 for the first time, then a succession of clock instants $t_{clock}$ may be defined, as shown by equation a. in Exhibit A, beginning with $t_{clock}$=t1.

At each such instant $t_{clock}$, the oldest sub-table or sub-tables STm, as designated by one of the pointer values P[n], e.g. P1, is or are cleared, i.e. released for receiving new data. The way the pointers P[n] represent the chronological order of sub-tables STm may have different forms. A simple form comprises using a cyclic permutation, such that, at each new clock instant $t_{clock}$:

just before that instant, P[1] aims at the currently active sub-tables, while P[L] aims at the oldest sub-tables;

at that instant, P[L] is erased, i.e. released for writing;

immediately after that, P[1] becomes P[2], P[2] becomes P[3], . . . P[L−1] becomes P[L], and P[L] becomes P[1], in accordance with the cyclic permutation, so that the new P[1] (formerly P[L]) becomes the currently active memory portion. The new P[L] (formerly P[L−1]), now aims at the oldest stored footprints.

Formally (in this embodiment):

if a packet is received within the time interval defined by equation I1 in Exhibit A, where t represents any instant, and its footprint X is not yet stored in the table Ti, this footprint X is stored in the cleared sub-table STm pointed during this time interval by the pointer P[1]. Each sub-table STm is only writable during the time interval it is pointed with the pointer P[1].

more generally, at an instant t, sub-tables STm being aimed at by pointers P[n'] designate sub-tables having received packets within the time interval defined by equation I2 in Exhibit A, n' being an integer varying from 2 to L.

Now, the detailed implementation of operations 650 and 670 of FIG. 8 may depend upon whether the message in the current packet Pa is complete, or, by contrast, is a fragment of a message being split over several packets. In the example, IP header of a packet Pa, field 225 or "IP-OFF" contains indications of the existence of fragments, and of the position of the current fragment in the complete message, in the form of fragmentation flags, and fragment offsets. Operations 650 and 670 will be described in a version taking fragmentation into account; however, the operations directed to fragment processing may be omitted in certain cases, e.g. depending upon the target system, and the expected level of performance.

Figure 11:
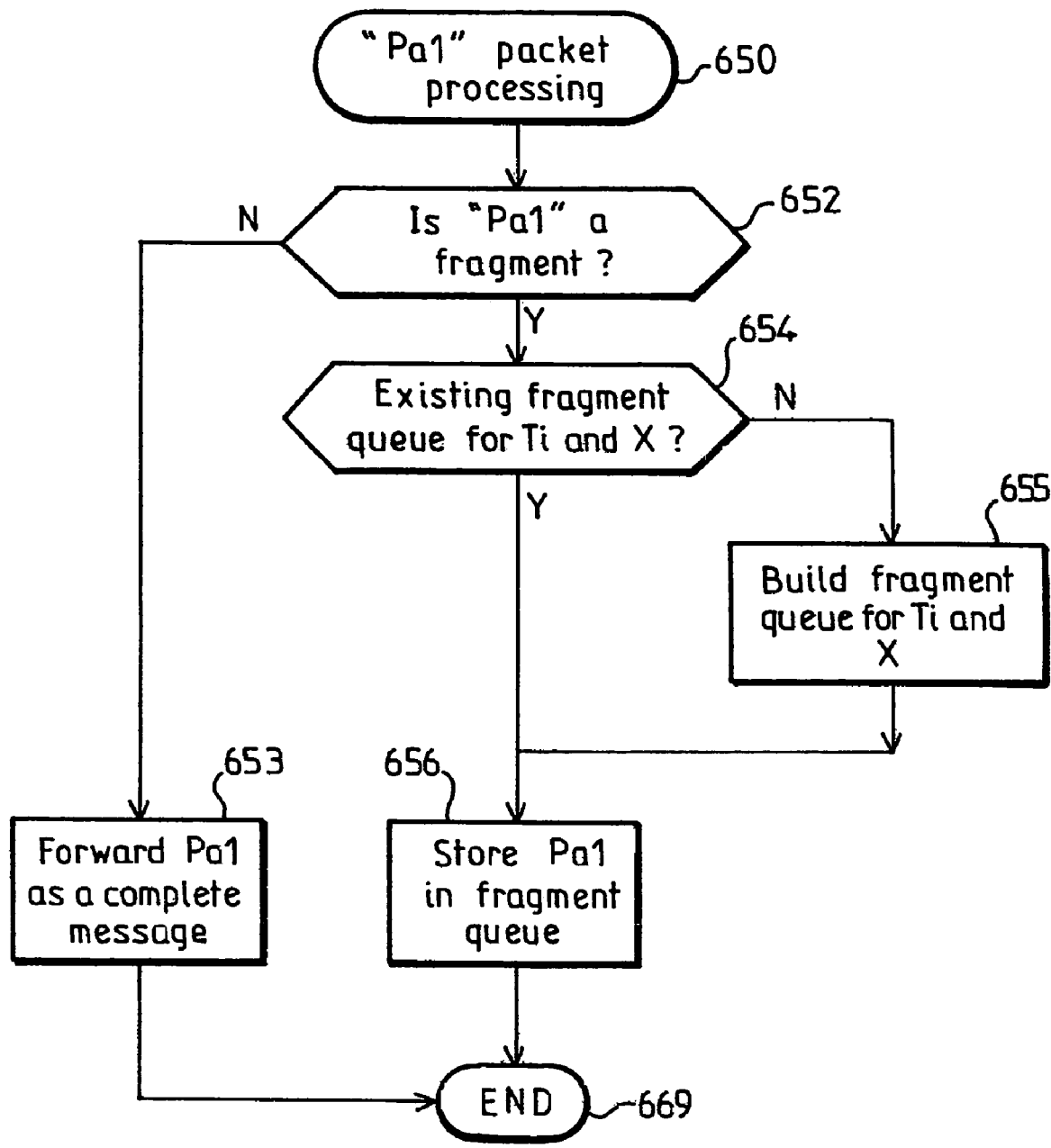
FIG. 11 shows an exemplary detailed embodiment of operation 650 in FIG. 8.

FIG. 11 now shows an exemplary implementation of operation 650 of FIG. 8. Operation 652 determines whether a first incoming packet having footprint X is a fragment, e.g. from field 225. If not, the packet may be forwarded (function 555) to upper layers at 653.

The case of a fragmented message will now be considered.

A fragment queue (FQ(X)) designates a queue of fragments, all having the footprint X, in the course of being assembled to obtain a complete data message with the same footprint X. In fact, the re-assemble( ) function may be used to receive packets having the same X, and to re-order them into a data message, in accordance with the fragment offset data in the field IP-OFF of the IP header of each "fragment-containing" packet. This storage task may be devoted to memory manager 560, using its memory area (or a separate memory area), or to a separate process, again using the memory area of 560 or a separate memory area, and interconnected with multi data link interface 101.

It should also be kept in mind that the fragments do not necessarily arrive in their native order.

Reverting to FIG. 11, operation 654 determines whether there is already a fragment queue for X (and Ti, i.e. the source address IP-orig). If not, a fragment is built at 655. At 656, the incoming fragment is stored at 656, either at a location defined from its field 225 or "IP-OFF", or together with a representation of its location in the complete message, for later re-ordering, then going to "end" 669.

FIG. 11 takes into account the fact that, being a first incoming packet with X, fragment Pa1 cannot already exist in the fragment queue.

Figure 12:
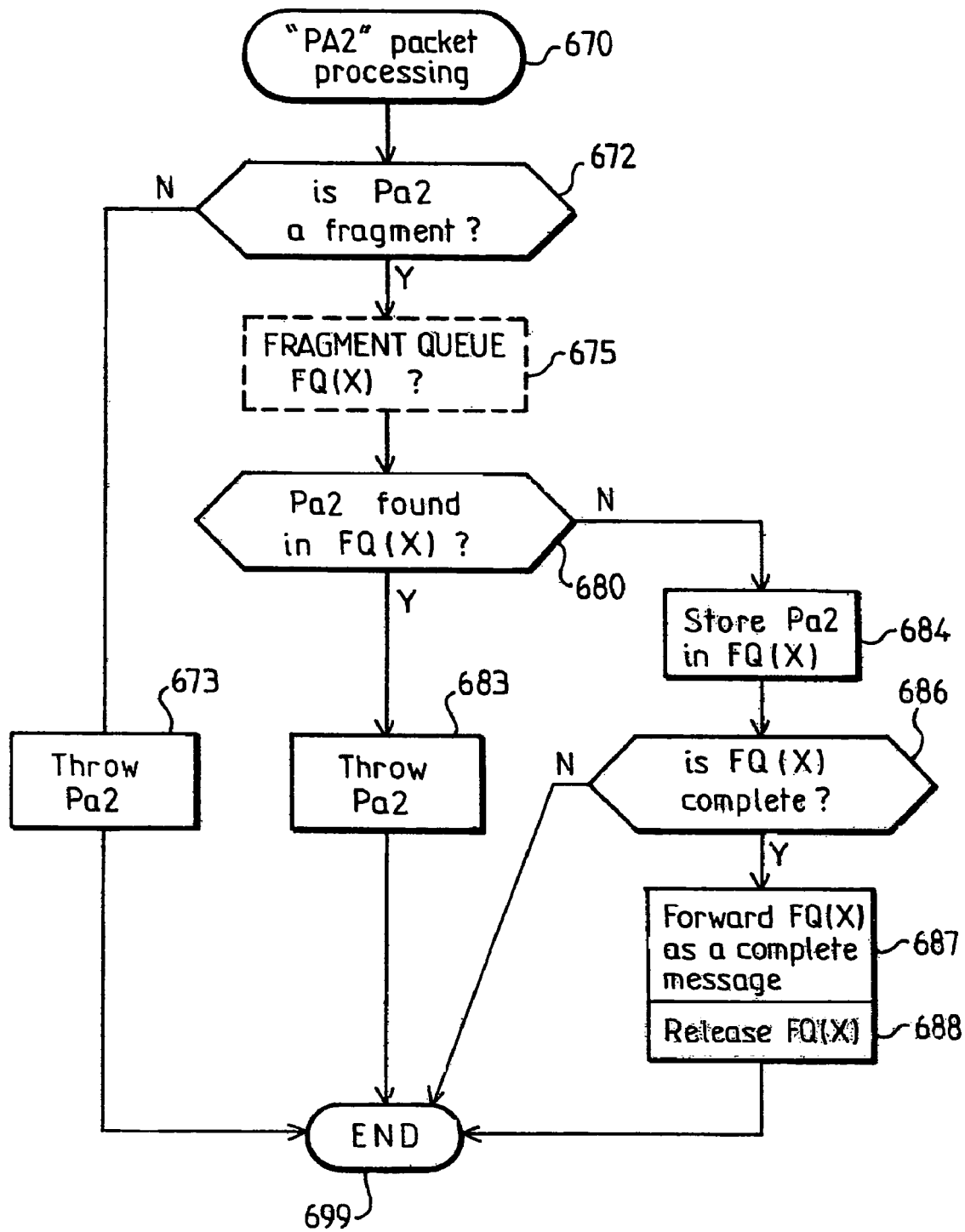
FIG. 12 shows an exemplary detailed embodiment of operation 670 in FIG. 8.

Now, FIG. 12 shows an exemplary implementation of operation 670 of FIG. 8 for a packet Pa2, i.e. a packet which is not the first incoming one with footprint X.

Operation 672 determines whether a packet Pa2 having footprint X is a fragment, e.g. from field 225. If not, the packet may be thrown or deleted (function 556) at 673, and "end" 699 is reached.

The case when Pa2 is a fragment shall now be considered.

Normally, a fragment queue already exists for X and Ti. However, if high reliability is desired, the existence of a fragment queue may be checked at 675 (the dashed line box illustrates the optional character of this). The operations in 675 may be similar to 654 and 655 in FIG. 11.

Then, operation 680 checks whether Pa2 is already present in fragment queue FQ(X). In the fragments have been immediately ordered, this may be made by determining whether the content at the fragment offset of Pa2 is occupied (and is Pa2, if desired); if the fragment offsets are stored in FQ(X) with the packets, this may be made by looking for the fragment offset of Pa2 amongst the fragment offset having already been stored.

If Pa2 is already present in fragment queue FQ(X), it may be thrown at 683, and "end" 699 is reached.

Otherwise, packet Pa2 is added to fragment queue FQ(X), at its location and/or together with a representation of its location, as previously.

Now, operation 686 checks whether the fragment queue is complete, again using the current and/or stored fragmentation data. If not, "end" 699 is reached. Otherwise, operation 687 may forward the complete message contained in FQ(X) to the upper layers. At 688, the memory for FQ(X) may be immediately released. Alternatively, it may be released at a later stage. It may be found interesting to release FQ(X) at the same time as X is released by the above mentioned IP-slowtimo process. Then, "end" 699 is reached.

If desired, the "fragment processing" operations in FIGS. 11 and 12 may be merged into a single process, which is called when a fragment is detected in either case.

In an embodiment, the function F( ) may comprise a so-called hash function H, which spreads packets as uniformly as possible in a table Ti, e.g. T1-1. Such a hash function indicates at any instant if the sub-table STm pointed with the pointer P[1], is full or not. If the corresponding sub-table STm is full, the table T1-1 is considered to be full and the function H has to allocate a new table, e.g. T1-2, to store packet footprints in a sub-table STm designated with the pointer P[1] during a given time interval CA/L. This new table is allocated between certain not allocated reserved tables in memory area.

In other words, this new table T1-2 provides an additional storage space to filter packets coming from the same source node as table T1-1. When the function H determines that tables T1-1 and T1-2 have full sub-tables STm, an other new table may be added, e.g. T1-3. Each of these tables store footprints of packets coming from the same given source node, in the example.

Another optional task is to release tables without footprint in any of their sub-tables. In an embodiment, the process called IP-slowtimo further has to detect, at each CA/L, allocated tables whose each sub-table has no footprint. These tables are then released and considered not to be allocated any more, i.e. freed to be allocated again.

The above described method and system elements enable a fast discrimination and filtering of redundant packets, while taking into account fragmented messages, if desired. This is due inter alia to the dynamic allocation of memory portions within the whole memory area being allocated to memory manager 560.

As above described together with its alternatives, the first embodiment of this invention has advantages where messages are exchanged frequently between a restricted number of stations, e.g. within the nodes of a cluster, in fields like communications, business, government, education, entertainment, for example.

However, this invention is not limited to the hereinabove described features.

In a second embodiment, packets coming from several source addresses might be stored commonly in the same portion of memory, i.e. in a single table T. If so, the footprint function F( ) should be supplemented to take the source address into consideration. In this case, the search( ) function of operation 632 in FIG. 8 would explore all allocated portions of the memory area, or even the whole memory area.

In this second embodiment, operations 641 and 642 of FIG. 9 may be changed, or even omitted, to the extent one or more packets coming from another source address have already caused a table T (more broadly, a memory portion) to be allocated, and written with the X values of these previous packets. In fact, if all incoming packets are stored in common in the whole memory area, there may be no need to implement operations 641 and 642.

In an alternative of the second embodiment, it may also be contemplated that tables Ti are dedicated to groups of source nodes, instead of individual source nodes. If so, the footprint function F( ) should be supplemented to take the source address into consideration, at least partially.

A third embodiment of this invention is an alternative for all the preceding ones. It concerns the processing of fragment packets. In this case, the value X takes into account the fragment identifying data, at least in part. For example, the value X may be defined from a concatenation of the value IP-ID, IP-PROT, and IP-OFF of the IP header (and also IP-orig, if a single table T is being used). In this case, each fragment carrying packet is processed like the packets having complete messages. In other words:

- in the firstly described embodiment, only the first incoming fragment packet is considered as Pa1; all subsequent packets are treated as Pa2, independently of their fragment offset, and of the fact they are first arrived, or redundant, for their particular offset;
- in the third embodiment, an incoming packet is considered as Pa1 if it is the first arriving for its fragment offset; thus, a packet seen as Pa2 is redundant with a previously received packet having the same offset.

In an version of that embodiment, operation 640 in FIG. 8 may be integrated to the Pa1 packet processing in operation 650.

In a fourth embodiment of this invention, where a fragment carrying packet is concerned, no footprint X (of fragment) is written in memory 560 at operation 640 (FIG. 8). Thus, only footprints of complete message packets are written in memory 560. The fragment carrying packets are not be filtered by using the footprint. Instead, all fragments are stored in the fragment queue, whether redundant or not. When the message is complete (i.e. all "offsets" are present, whether redundant or not), the reassemble( ) function gathers the whole message and ignores the redundant fragments. In other words, the filtering of fragment packets is made in the fragment queue, at the time the reassemble( ) function is executed.

The reassemble( ) function identifies the identical duplicated fragments with the value X being a concatenation of the value IP-ID, IP-PROT, and IP-OFF of the IP header. The reassemble( ) function throws duplicated fragments. Once a fragmented data message is reassembled, the fragment queue is freed and the complete data message is forwarded to upper layer. Those skilled in the art will note that any subsequently arriving fragment packets, being redundant with the just completed message, will create a new fragment queue, which is not useful.

In an alternative of the fourth embodiment, where fragment carrying packets are concerned, the footprint X is written in memory 560 only after the complete message has been reassembled. In this case, the footprint X need not comprise any fragment identification data. Thus, both footprints of complete message packets and of reassembled fragmented data messages are written in memory 560. These operations may be added in FIG. 11, after operation 656. Thus, any subsequently arriving fragment packets are filtered. Indeed, after forwarding a reassembled fragmented data message and storing its footprint in memory 560, the duplicated fragment carrying packets corresponding to this footprint in operation 632, FIG. 8, are thrown, in operation 670. Thus, no duplicated fragment of a fragmented data message is stored in a new fragment queue.

This invention also covers the software code for performing the method, especially when made available on any appropriate computer-readable medium. The expression "computer-readable medium" includes a storage medium such as magnetic or optic, as well as a transmission medium such as a digital or analog signal. The software code basically includes separately or together, the codes defining the memory manager 560, the packet manager 550, and the codes for implementing at least partially the flow-charts of FIGS. 5, 6, 8, 9 11 and 12.

Exhibit A $$t_{clock} = t1 + p \times CA/L \qquad \text{a.}$$

$$[t-(t-t1)MOD(CA/L), t] \qquad \text{I1.}$$

$$[t-(t-t1)MOD(CA/L)-(n'-1)\times CA/L, t-(t-t1)MOD(CA/L)-(n'-2)\times CA/L] \qquad \text{I2.}$$

The invention claimed is:

1. A non-transitory computer readable storage medium storing software code, wherein the software code is computer-executable to implement:

a memory manager at a network node, the memory manager having a reserved memory area in which the memory manager defines a currently designated portion of memory, and an incoming packet manager at the network node, wherein the incoming packet manager is responsive to receiving an incoming packet, wherein the incoming packet comprises:

a routing protocol header usable by a network routing protocol to route the packet across a network from a network source to a final network destination, wherein the routing protocol header indicates the network node as the final network destination of the incoming packet, and a separate transport protocol header, usable by a separate transport protocol to establish a connection between the network source and the incoming packet manager;

wherein in response to receiving the incoming packet, the incoming packet manager is configured to perform:

generating an identifier from information contained in the routing header, searching for the identifier in at least the currently designated portion of the reserved memory area, in response to determining that the designated portion of memory does not store an indication of the identifier, determining that the incoming packet is not a redundant instance of the incoming packet and storing an indication of the identifier in the currently designated portion of memory, and in response to determining that the designated portion of memory contains an indication of the identifier, determining that the incoming packet is a redundant instance of a previously received packet and filtering out the incoming packet as redundant;

wherein said generating, said searching, said storing and said filtering are performed independent of the transport protocol.

2. The computer readable storage medium of claim 1, wherein:

the memory manager is configured to define a message fragment memory area in its reserved memory area, and wherein the incoming packet manager is further configured to perform: in response to determining that the incoming packet contains a message fragment, the incoming packet manager storing at least a portion of the packet in the message fragment memory area.

3. The computer readable storage medium of claim 2, further comprising a mechanism for re-assembling a message when all its fragments have been stored in the message fragment memory area.

4. The computer readable storage medium of claim 2, wherein:

the identifier is determined from incoming packet information which includes fragment identifier information, and wherein said determining that the incoming packet contains a message fragment comprises determining that the incoming packet contains a message fragment and the identifier of the incoming packet being not found in said message fragment memory area.

5. The computer readable storage medium of claim 2, wherein:

the identifier is determined from information other than fragment identifier information, and wherein said determining that the incoming packet is a redundant instance is further dependent on the incoming packet data containing an unfragmented message.

6. The computer readable storage medium of claim 5, wherein said determining that the incoming packet is not a redundant instance is further dependent on the incoming packet containing an unfragmented message.

7. The computer readable storage medium as recited in claim 1, wherein:

the memory manager is configured to define selected sub-areas in the reserved memory area, and of defining a selected currently designated portion of memory in each such selected sub-area;

the identifier is determined from information in the packet other than source-related information, the incoming packet manager performs the search in a selected sub-area associated to the source address of the incoming packet, and in response to determining that the incoming packet is not a redundant instance, the identifier is stored in a currently designated portion of memory of a selected sub-area associated to the source address of the incoming packet.

8. The computer readable storage medium as recited in claim 1, further comprising a monitoring timer mechanism, configured to release areas in the reserved memory which contain older identifiers.

9. The computer readable storage medium of claim 8, wherein:

the memory manager keeps a chronological track of prior designated portions of memory and the monitoring timer periodically orders the memory manager to release oldest ones of the designated portions of memory;

the memory manager is configured to release oldest ones of the designated portions of memory according to said order.

10. The computer readable storage medium as recited in claim 1, wherein the memory manager comprises a hash function for storing data in the reserved memory area.

11. The computer readable storage medium as recited in claim 1, wherein the memory manager is arranged to assign an additional currently designated portion of memory, when a currently designated portion of memory is full.

12. The computer readable storage medium as recited in claim 1, wherein prior to said searching, the software code is further computer executable to:

determine if the destination address of the incoming packet matches a proper address, and in response to determining the destination address of the incoming packet matches the proper address, the software code is further configured to perform the search.

13. A computer-implemented method of processing redundant packets, comprising:

receiving at a computer station an incoming packet from a network, wherein the incoming packet comprises the routing protocol header, which is usable by a network routing protocol to route the packet across a network from a network source to the computer station and a separate transport protocol header, usable by a separate transport protocol to establish a connection between the network source and the computer station;

in response to said receiving, the computer station generating an identifier from information contained in the routing protocol header of the incoming packet, searching for the identifier in at least a portion of a reserved memory area, and processing the packet, the processing comprising:

in response to determining that the portion of the reserved memory area does not store an indication of the identifier, determining that the incoming packet is a not a redundant instance of the incoming packet and not a redundant instance of a previously received packet and storing an indication of the identifier in the portion of the reserved memory area, wherein said generating, said searching, said storing and said filtering are performed independent of the transport protocol subsequent to said processing the packet: receiving a second packet, generating the identifier from information contained in the routing protocol header of the second packet, searching for the identifier in at least the portion of the reserved memory area, and processing the second packet, the processing comprising: in response to determining that the portion of the reserved memory area stores an indication of the identifier, determining that the second packet is a redundant instance of the incoming packet.

14. The method of claim 13, wherein said processing the packet further comprises:

responsive to determining that the incoming packet contains a message fragment, storing at least a portion of the packet in a message fragment memory.

15. The method of claim 14, wherein said processing the packet further comprises: re-assembling a message when all its fragments have been stored in the message fragment memory area.

16. The method of claim 14, wherein:
said determining an identifier comprises determining the identifier from the incoming packet information which includes fragment identifier information, and
said storing at least a portion of the packet in a message fragment memory is further dependent on determining that the incoming packet containing a message fragment and its identifier being not found in said message fragment memory area.

17. The method of claim 14, wherein:
said determining an identifier comprises determining the identifier from information other than fragment identifier information.

18. The method of claim 17, wherein:
said determining that the incoming packet is a redundant instance of the incoming packet is further dependent on the identifier not being found during said searching and the incoming packet containing an unfragmented message.

19. The method as recited in claim 13, wherein:
said determining an identifier comprises determining the identifier from information other than source-related information,
said searching comprises searching for the identifier in the portion of the reserved memory in response to determining that the portion is associated to the source address of the incoming packets.

20. The method as recited in claim 13, further comprising: at time intervals, releasing areas in the reserved memory which contain older identifiers.

21. The method of claim 20, wherein said releasing comprises:
keeping a chronological track of prior designated portions of memory, and
periodically releasing oldest ones of the designated portions of memory.

22. The method as recited in claim 13, wherein said processing the packet comprises using a hash function for storing data in the reserved memory area.

23. The method as recited in claim 13, wherein said storing the identifier in the portion of the reserved memory area is performed in response to determining that a different portion of memory is full.

24. The method as recited in claim 13, wherein prior to said searching:
verifying the destination address of the incoming packet matches a proper address, and
in response to said verifying, perform said searching.

25. A computer station, comprising:
a memory storing code for executing:
a protocol stack, and
a multiple data link interface configured to implement the method of claim 13.

26. A cluster having a plurality of nodes interconnected through a redundant link, in which at least two of the nodes are configured to implement the method of claim 13.

* * * * *